No. 792,656. Patented June 20, 1905.

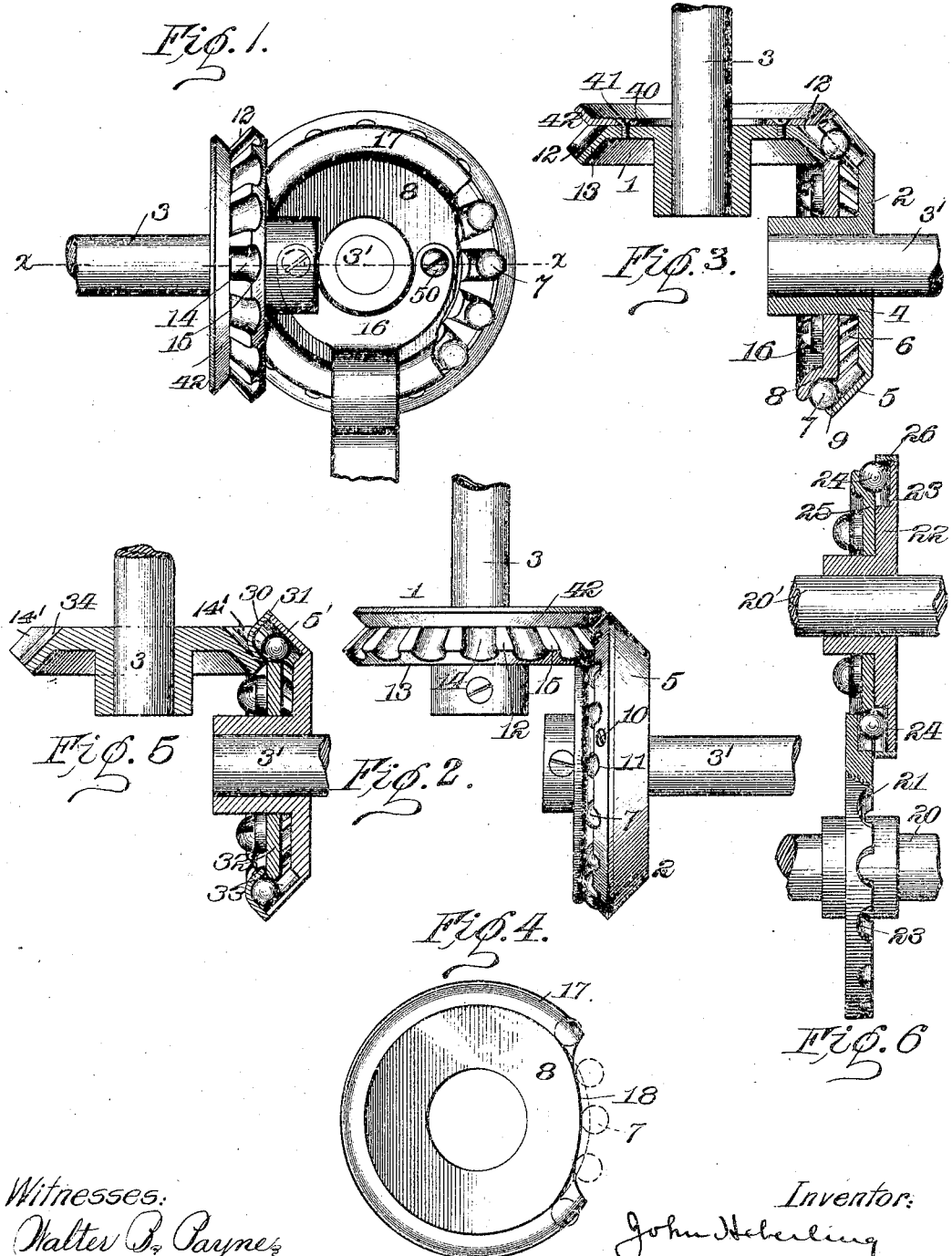

UNITED STATES PATENT OFFICE.

JOHN HEBERLING, OF ROCHESTER, NEW YORK, ASSIGNOR OF ONE-HALF TO HERBERT J. STULL AND JOHN M. STULL, OF ROCHESTER, NEW YORK.

GEARING.

SPECIFICATION forming part of Letters Patent No. 792,656, dated June 20, 1905.

Application filed July 21, 1899. Serial No. 724,687.

*To all whom it may concern:*

Be it known that I, JOHN HEBERLING, of Rochester, in the county of Monroe and State of New York, have invented certain new and useful Improvements in Gearing; and I do hereby declare the following to be a full, clear, and exact description of the same, reference being had to the accompanying drawings, forming a part of this specification, and to the reference-numerals marked thereon.

My present invention has for its object to provide an improved gearing adapted particularly to be used as a driving mechanism for bicycles and one in which the power between the revoluble members arranged at an angle to each other may be transmitted with the minimum amount of friction between the parts.

My further object is to provide a gear that will run easily and smoothly and in which either portion may be employed as a driving member.

To these and other ends my invention consists in certain improvements in construction and combination of parts, all as will be described, and the novel features pointed out in the claims at the end of the specification.

In the drawings, Figure 1 is a view showing an end elevation of a pair of gears constructed according to my invention; Fig. 2, a top plan view; Fig. 3, a sectional view on the line $x\,x$ of Fig. 1; Fig. 4, an elevation of the inner side of the ball-retainer; Fig. 5, a view, partly in section, showing a modified form of ball-retainer; and Fig. 6, a view showing my invention adapted to a pair of straight gears.

Similar reference-numerals in the several figures indicate similar parts.

In the construction of my gear I employ two coöperating pinions or gear-wheels and separate movable engaging members carried upon one of the wheels and adapted to be engaged between the teeth or stationary projections upon the coöperating gear member as the gears are revolved. In the present form of my device I provide the pinions 1 and 2, mounted upon the shafts or revoluble members 3 and 3'. The gear 2 is composed of the disk or back 4, having an outwardly-projecting angular flange or rim 5 provided with a series of radially-extending recesses or sockets 6, equally spaced around the circumference of the flange and adapted to contain balls 7, the latter being held in position in the sockets or recesses by a ball-retainer 8 and by a plate or flange 9, forming a retainer upon the periphery of the rim 5 and secured by screws 10. The latter is adapted to limit the outward movement of the balls as they are brought into successive engagement with the gear member 1, and as it is not necessary that the ends of the slots be entirely closed to accomplish this object, and to allow the ball an increased lateral movement, I form notches 11 in the plate, having a diameter less than that of the ball. The gear member 1 is provided with teeth or stationary projections 12, formed upon a flange 13, adapted to extend approximately parallel to the inner face of the flange 5 on the gear 2 near their point of coöperation. These teeth 12 are formed between the grooves 14, similar to the grooves or slots 6, and are pointed slightly by flaring the outer edges of the grooves, as at 15, to permit their passing readily into and out of engagement with the balls 7. By this construction it will be seen that the balls being held in position in the grooves 6 by the retainer are presented successively to the corresponding grooves 14 in the pinion 1. The teeth 12 pass between the balls as the gears are revolved, causing the balls to roll in the grooves 6 toward and from the center of rotation of the shaft 3' as the teeth engage them when moving toward and from the intersection of the pitch-lines. To permit the desired movement of the balls in their slots, as well as to present them in the proper position for the advancing tooth, it is necessary to employ a specially-constructed ball-retainer, before referred to and indicated by 8. This retainer is adapted to be rigidly supported in any convenient manner independently of gear 2, and for this purpose I have shown an arm 16 screwed to the retainer by screws 50 and which may be attached to the bearing of the shaft 3' or to any other suitable stationary support. The retainer consists of a ring or disk having an annular passage or race way formed by the overhanging flange 17, which serves to hold the balls outwardly in proper position to be presented to the coöperating teeth in the other gear member. Upon the side next to the proximate faces of the gear the flange 17 is cut away, as shown particularly in Fig. 4, and the circumference of the ball-raceway is cut away slightly, as shown at 18, the difference being illustrated by the dotted line and being equal to the distance traversed by each ball as it rolls radially in its slot or groove under the pressure of the engaging tooth and extends in a line generated by the rolling movement of the ball as it passes into and out of engagement with the coöperating gear member.

In the drawings I have shown a ring 40 secured to the rear face of the gear 1 by screws 41, having the flaring rim 42, which may be employed in place of the plate 8 to prevent the displacement of the balls when in operative engagement between the gear members. The balls at other times, it will be remembered, are secured by the flange 17 on the stationary retainer. This principle of employing separate balls as engaging means between the coöperating pinions is equally well adapted to be employed in straight gears mounted upon parallel shafts, and in Fig. 6 I have shown a pair of gears of this combination. Mounted upon the shafts 20 and 20' are the pinions 21 and 22, having the overlapping faces and the radially-extending recesses or slots formed therein. The latter pinion is provided with the balls 24, which are secured in the recesses by the guide or raceway 25 and the retainer 26, secured upon the periphery of the pinion. The teeth upon the pinion 21, formed between the recesses 23, are pointed similar to the teeth 12 heretofore described.

In Fig. 5 I have shown a modification of the ball-retainer consisting of a series of curved fingers 30, formed upon a plate or ring 31, secured upon the outer edge of the flange 5'. Each finger is adapted to extend across the end of the recess and over the outside of the ball, and a stationary plate 32, having a raceway 33, positions the balls in their recesses. A slot or channel 34 is provided at the bottom of each of the grooves 14' in the engaging pinion to accommodate the retainer-fingers as the parts of the gear intermesh. Gears constructed in this manner possess a great degree of efficiency, and by the arrangement of the balls in slots or grooves, whereby a rolling movement is permitted the ball longitudinally of the recesses or sockets where they pass into and out of engagement with the coöperating gear member, reduces the friction to a minimum. The teeth 12 on the gear member are formed on epicycloidal curves or lines generated by the movement of the surface of the balls, so as to insure a rolling contact and permit perfect freedom of the parts when moving into and out of engagement.

I claim as my invention—

1. In gearing the combination of two gears rotatable on axes arranged at an angle relatively, one gear having an annular flange arranged at an angle to the plane of rotation and provided with teeth and the other gear having the recesses corresponding to the space between the teeth and balls arranged in the recesses and engaging the teeth and movable longitudinally thereof and forming engaging means between the angular overlapping portions of the gears.

2. In gearing the combination with the gear having an angular flange provided with teeth upon its outer surface, and a coöperating gear arranged at an angle thereto having an annular flange adapted to overlap the flange on the other gear and provided with recesses, of the balls lying in the recesses and forming engaging means between the overlapping portions of the gears and movable longitudinally between the teeth and the sides of the recesses of the respective gear-wheels.

3. In angle-gearing the combination with the gear having an angular flange provided with teeth upon its outer face, of a coöperating gear having a flange overlapping the flange on the former gear and provided with recesses upon its inner surface, and the balls supported in the recesses and adapted to move radially therein when engaged between the teeth of the coöperating gear.

4. In angle-gearing the combination with the gear having the teeth, of a coöperating gear having the radially-extending recesses, the balls in the recesses, and a retainer independent of the gear-wheel for securing the balls in the recesses and permitting their longitudinal movement in the recesses.

5. In angle-gearing the combination with the gear having the teeth, of a coöperating pinion having the radially-extending recesses or grooves, the balls carried in the grooves and a retainer for positioning the balls in the grooves and supported independently of the pinions.

6. In angle-gearing the combination with the gear having the teeth, of a coöperating pinion having the grooves or recesses, the balls arranged in the latter, and the plate forming a stationary raceway for positioning the balls in the grooves and a retainer for limiting their outward movement.

7. In angle-gearing the combination with the gear having the teeth, of a coöperating gear having the radially-extending recesses or grooves, the balls carried in the latter and the plate forming a stationary raceway independent of the pinion for positioning the balls in the grooves, and a retainer carried upon the pinion for limiting their outward movement.

8. In angle-gearing the combination with the gear provided with a rim having the radially-extending teeth on the side thereof having the recesses between them, of a coöperating gear having similar recesses overlapping the former recesses when the gears are revolved, the balls carried in the recesses and capable of moving radially upon the gear when engaged by the teeth of the coöperating gear.

9. In angle-gearing the combination with the gear having the radial teeth, of a coöperating gear member having radial recesses, the balls carried in the recesses and adapted to be engaged by the teeth of the first-mentioned gear member and movable radially upon their supports and a retainer for supporting the balls in the recesses and forming a raceway or guide to return the balls to their normal position after coöperation with the gear.

10. In angle-gearing the combination with the two coöperating gear members, the balls engaged between them and carried upon and movable radially of one of the said gear members, of a ball-retainer for supporting and guiding the balls having the raceway cut away at the side next to the proximate faces of the gear members.

11. In angle-gearing the combination with the two coöperating gear members having the flanges, provided with the radial recesses formed thereon, and the balls operating therein between the gear members, a retainer and a plate forming the raceway for guiding the balls, cut away upon the side next to the proximate faces of the gear members to allow the balls to move radially of the pinion when revolved into the operative position.

12. In gearing, the combination with two coöperating rotary gear members rotating on centers, of a means carried upon one of the members engaged upon its forward and rear sides by both members and capable of an independent longitudinal movement upon its supporting member when positively engaged by the other member to form a driving connection when the two members are rotated in either direction.

13. In gearing the combination with the pinion having the teeth and the coöperating pinion having teeth arranged at one side of the plane of the teeth on the first pinion, of the revoluble and longitudinally-movable balls carried on one of the pinions and adapted to be engaged between the coöperating teeth upon the other pinion to form a driving connection between the pinions.

JOHN HEBERLING.

Witnesses:
G. WILLARD RICH,
LILIAN J. MYERS.